United States Patent
Lee

(10) Patent No.: US 8,746,083 B2
(45) Date of Patent: Jun. 10, 2014

(54) TORQUE SENSOR HAVING A RING-SHAPED STATOR

(75) Inventor: Changhwan Lee, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 188 days.

(21) Appl. No.: 13/241,706

(22) Filed: Sep. 23, 2011

(65) Prior Publication Data

US 2012/0260746 A1 Oct. 18, 2012

(30) Foreign Application Priority Data

Apr. 15, 2011 (KR) .................. 10-2011-0034962

(51) Int. Cl.
*G01L 3/02* (2006.01)

(52) U.S. Cl.
USPC .................................... 73/862.332

(58) Field of Classification Search
USPC ...................... 73/862.331–862.335
See application file for complete search history.

(56) References Cited

U.S. PATENT DOCUMENTS

| | | | |
|---|---|---|---|
| 3,497,738 A * | 2/1970 | Mariani | 310/78 |
| 4,093,897 A * | 6/1978 | Fujita et al. | 318/400.04 |
| 4,654,566 A * | 3/1987 | Erdman | 318/400.01 |
| 6,998,755 B2 * | 2/2006 | Kloepzig et al. | 310/254.1 |
| 8,390,276 B2 * | 3/2013 | McDonald et al. | 324/207.25 |
| 2004/0074314 A1 | 4/2004 | Nakane et al. | |
| 2004/0239207 A1 | 12/2004 | Kloepzig et al. | |
| 2008/0024028 A1 * | 1/2008 | Islam et al. | 310/187 |
| 2010/0319466 A1 * | 12/2010 | Bae et al. | 73/862.325 |

FOREIGN PATENT DOCUMENTS

| | | |
|---|---|---|
| CN | 1191306 A | 8/1998 |
| CN | 1914493 A | 2/2007 |
| CN | 101836097 A | 9/2010 |

OTHER PUBLICATIONS

Office Action dated Mar. 10, 2014 in Chinese Application No. 201210111580.2.

* cited by examiner

*Primary Examiner* — Max Noori
(74) *Attorney, Agent, or Firm* — Saliwanchik, Lloyd & Eisenschenk

(57) ABSTRACT

The present disclosure relates to a torque sensor configured to axially magnetize a magnet and simplify a stator structure facing the magnet, whereby dimensions and shapes of members capable of collecting magnetism can be easily controlled to provide a torque sensor excellent in operational reliability, the torque sensor including a ring-shaped and axially-magnetized magnet connected to one of an input shaft of a steering wheel and an output shaft; and a stator including a ring-shaped body axially discrete from the magnet and a plurality of holes vertically penetrating the body, whereby structure of the torque sensor is simplified to enhance a concentrated efficiency of magnetic change.

17 Claims, 2 Drawing Sheets

TORQUE SENSOR HAVING A RING-SHAPED STATOR

CROSS-REFERENCE TO RELATED APPLICATION

This application claims the benefit under 35 U.S.C. §119 of Korean Application Number 10-2011-0034962, filed Apr. 15, 2011, which is hereby incorporated by reference in its entirety.

BACKGROUND OF THE DISCLOSURE

1. Field of the Disclosure

The present disclosure relates to a torque sensor.

2. Discussion of the Related Art

In a conventional vehicle, a steering wheel connected to wheels is operated to manipulate a traveling direction of the vehicle. However, an operating force may decrease to make it difficult to quickly operate the vehicle, in case there is a large resistance between wheels and road surface, or there is generated an obstacle to the steering operation. In order to solve the problem, a power steering system is proposed. The power steering system serves to provide a power transfer device to operation of the steering wheels, thereby reducing operating force.

In order for the power steering system to provide a force of operating the steering wheels, needs arise to measure a torque applied to a steering axis, a steering angel and an angular velocity. Apparatus of various methods are proposed for measuring torques of steering wheel. Particularly, a method for detecting a torque is largely employed for economic reasons in which a magnetic field of a magnet coupled to a steering axis is measured to detect the torque.

A steering structure generally includes an input shaft coupled to a steering wheel, an output shaft coupled to a pinion meshed to a rack bar of wheel side, and a torsion bar connecting the input shaft to the output shaft.

In case a steering wheel is rotated, a rotational force is transmitted to the output shaft to change wheel directions responsive to operation of pinion and rack bar. In this case, if resistance is great, the input shaft is further rotated to twist the torsion bar, where a twist level of torsion bar is measured by a torque sensor of magnetic field method.

FIG. 1 is a perspective view illustrating a torque sensor according to prior art. A magnet (10) is coupled to an input shaft, where the magnet (10) takes the shape of a ring. An output is arranged with stators (20, 30), which in turn include vertical lug pieces (21, 31) discretely arranged on a periphery of the magnet (10) and axially bent.

In a case a torsion bar is generated with a twist by a rotational difference between an input shaft coupled to the magnet (10) and an output shaft coupled to stators (20, 30), magnet (10) is rotated relative to the stators (20, 30), where an opposite surface between a periphery of the magnet (10) and lug pieces (21, 31) is changed to change a magnetic value, whereby a torque can be measured.

A collector (40) is arranged to collect the magnetization value and a magnetic element (50) detects the magnetization value collected by the collector (40). Meantime, there is a limit in obtaining an area capable of magnetizing the stators (20, 30) under this arrangement, and thus there is generated a disadvantage of a weak torque signal, that is, a weak magnetic signal. As a result, there is generated a disadvantage of adding a separate process for preparing bent surfaces of stators (20, 30), and arranging the collector (40), whereby structure is complicated to decrease a magnetic detection efficiency.

Another disadvantage under this structure is that it is difficult to bend and arrange the lugs (21, 31) opposite to the magnet (10) in equal dimensions and shapes because a gap between the lug pieces (21, 31) must be equally maintained and it is also difficult to accurately arrange the lug pieces (21, 31).

BRIEF SUMMARY

The present disclosure is directed to cope with the above-mentioned disadvantages and it is an object of the present disclosure to provide a torque sensor configured to axially magnetize a magnet and simplify a stator structure facing the magnet, whereby dimensions and shapes of members capable of collecting magnetism can be easily controlled to provide a torque sensor excellent in operational reliability.

Technical problems to be solved by the present disclosure are not restricted to the above-mentioned description, and any other technical problems not mentioned so far will be clearly appreciated from the following description by the skilled in the art.

In one general aspect of the present disclosure, there is provided a torque sensor, the torque sensor comprising: a ring-shaped and axially-magnetized magnet connected to one of an input shaft of a steering wheel and an output shaft; and a stator including a ring-shaped body axially discrete from the magnet and a plurality of holes vertically penetrating the body, whereby structure of the torque sensor is simplified to enhance a concentrated efficiency of magnetic change.

Preferably, the stator includes an upper stator arranged at an upper side of the magnet and a bottom stator arranged at a bottom side of the magnet, where the magnet is formed by connecting a plurality of magnet pieces, and the number of holes at the upper stator and the bottom stator is same as that of electrodes formed at the magnet, whereby productivity of upper and bottom stators can be enhanced, and accuracy of dimensions and shapes thereof can enhanced.

Preferably, the magnet includes an upper magnet arranged at a bottom side of the upper stator and a bottom magnet arranged at an upper side of the bottom stator, whereby detection efficiency and economy of magnetic change can be excellently enhanced.

Preferably, the torque sensor further comprises an upper collector and a bottom collector each coupled to the upper stator and the bottom stator for concentrating magnetic change, whereby detection of magnetic change can become more accurate.

Preferably, the torque sensor further comprises a magnetic element coupled to the upper and bottom collectors to detect the magnetic change of the stator.

Preferably, the torque sensor further comprises a magnetic element coupled to the upper and bottom stators to detect the magnetic change of the stator, whereby structure of the torque sensor is simplified to enhance productivity.

Preferably, a radial length of the hole is longer than a radial width of the magnet, whereby concentration of magnetic change in the magnet can become further accurate.

In another general aspect of the present disclosure, there is provided a torque sensor, the torque sensor comprising: a ring-shaped and axially-magnetized magnet; and an upper stator and a bottom stator, each shaped of a ring plate, arranged at an upper and a bottom side of the magnet, and circumferentially arranged with a plurality of vertically penetrated holes.

Preferably, the magnet includes an upper magnet arranged at a bottom side of the upper magnet and a bottom magnet arranged at an upper side of the bottom magnet, whereby detection efficiency and economy of magnetic change can be excellently enhanced.

Preferably, the magnet is circumferentially arranged with a plurality of magnet pieces.

Preferably, the number of holes is formed in the same number of electrodes on the magnet.

Preferably, a radial length of the hole is longer than a radial width of the magnet, whereby concentration of magnetic change in the magnet can become further accurate.

As apparent from the foregoing, the torque sensor according to exemplary embodiment of the present disclosure is advantageous in that a magnetic flux is axially formed, and a stator measuring a magnetic change of a magnet includes a plate-shaped body and a hole penetrating the body, such that arrangement relationship is simple and measurement of magnetic change can become more accurately.

There is another advantage in that a stator is formed by a simple process of forming a hole on a body to further improve control of dimension and shape and to enhance ensuing productivity, in consideration of the fact that a conventional stator needs to bend a stator piece in the manufacturing and machining processes of stator.

BRIEF DESCRIPTION OF THE DRAWINGS

The accompanying drawings, which are included to provide a further understanding of the present disclosure and are incorporated in the present disclosure and constitute part of this application, and together with the description, serve to explain the principle of the disclosure. In the drawings.

DETAILED DESCRIPTION

Figure 1:
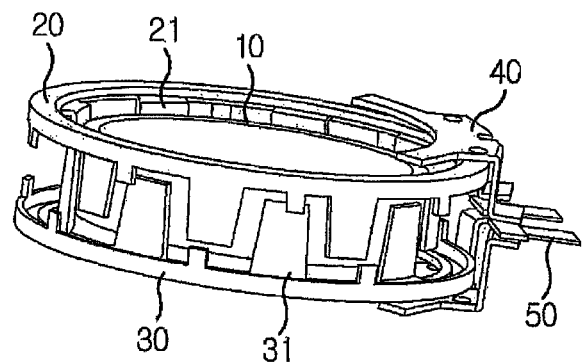
FIG. 1 is a perspective view illustrating a torque sensor according to prior art.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Now, a torque sensor according to the exemplary embodiments of the present disclosure will be described in detail with reference to the accompanying drawings.

Figure 2:
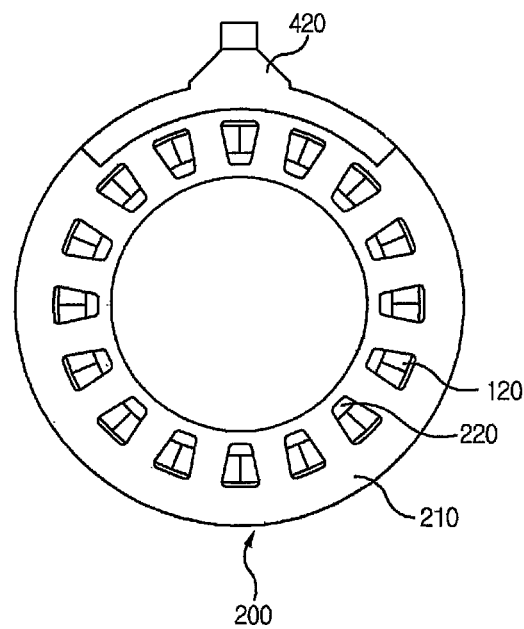
FIG. 2 is a plane view illustrating a torque sensor according to the present disclosure.
Figure 3:
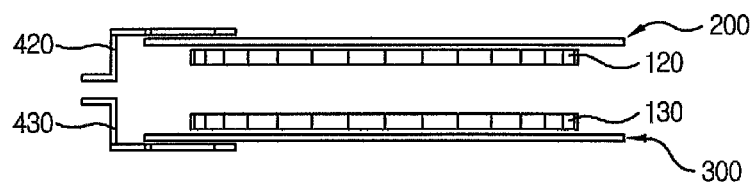
FIG. 3 is a lateral view illustrating a torque sensor according to the present disclosure.
Figure 4:
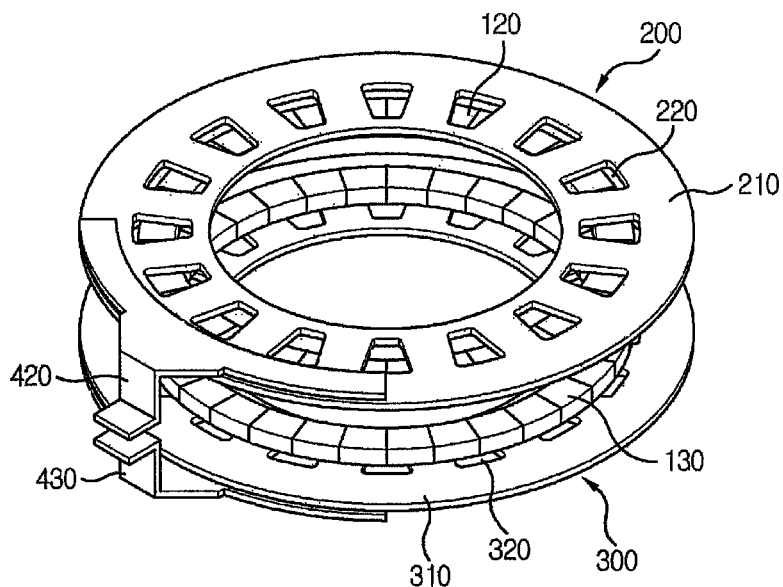
FIG. 4 is a perspective view illustrating a torque index according to the present disclosure.

FIG. 2 is a plane view illustrating a torque sensor according to the present disclosure, and FIG. 3 is a lateral view illustrating a torque sensor according to the present disclosure.

Referring to FIGS. 2 and 3, each of magnets (120, 130) takes the shape of a ring, and is generally arranged at a periphery of an input shaft to rotate by being coupled together. Furthermore, each of stators (200, 300) is connected to an output shaft to rotate together.

If rotational amount between the input shaft and the output shaft is different due to resistance, torsion is understandably generated, and the difference is measured by magnetic field. However, it should be apparent that the magnets (120, 130) are connected to the output shaft, and the stators (200, 300) are connected to the input shaft.

The magnet (120) is preferably connected by two or more magnet pieces. Therefore, a plurality of magnet pieces each in arc shape constitutes the ring-shaped magnets (120, 130). In this case, each of the magnet pieces is axially magnetized according to the present disclosure.

In a case the magnets (120, 130) are axially magnetized, the magnet flux is also inputted or outputted to the axial direction, whereby the magnet flux can be measured across the magnets (120, 130).

The ring-shaped magnet is coupled to a periphery of the input shaft, where it should be apparent that the magnet may be comprised of a single row of magnet pieces, and two magnets may be axially discrete to form an upper magnet (120) and a bottom magnet (130), as shown in FIG. 3.

Therefore, it is advantageous that detection of magnetization can be more accurate, if the upper magnet (120) and the bottom magnet (130) face the upper stator (200) and the bottom stator (300).

As noted from the above, the stator includes the upper stator and the bottom stator (300) each disposed on an upper end and a bottom end of the magnets (120, 130). Each of the stators (200, 300) include ring-shaped plated bodies (210, 310) and a plurality of holes (220, 320) penetrating the bodies in the axial direction.

The present disclosure presents a concept in which holes (220, 320) each facing an electrode of the magnets (120, 130) concentrate magnetic change in response to relative rotation between the magnets (120, 130) and the stators (200, 300). The upper stator (200) and the bottom stator (300) are configured in such a manner that the ring-shaped body (210) and the bottom body (310) are connected to the output shaft, and discretely arranged from an upper end of the upper magnet (120) and a bottom end of the bottom magnet (130).

Now, the upper stator (200) will be specifically described in the first place. The upper stator (200) penetrates the ring-shaped upper body (210) to allow a plurality of upper holes (220) to vertically penetrate, where the upper holes (220) are arranged opposite to magnetized electrodes of upper magnet (120).

Therefore, it can be explained that the upper body (210) includes, based on arrangement of upper hole (220), a ring-shaped outer peripheral unit at an outer periphery side and a ring-shaped inner peripheral unit at an inner periphery side, where the outer and inner peripheral units form a lateral surface of each hole and mutually connected by a radially extended extension unit.

Furthermore, the bottom body (310) includes, based on arrangement of bottom hole (320), an outer peripheral unit, an inner peripheral unit and an extension unit. The outer peripheral unit, i.e., a peripheral side of the upper body (210), is arranged on an upper collector (420) to concentrate a magnetic value, and connected to a magnetic element (not shown) along with a bottom collector (430) connected to the bottom body (310). The magnetic element is preferably a Hall element or a Hall IC.

Meantime, although the exemplary embodiment of the present disclosure explains a concept in which magnetization is concentrated that is changing by allowing the upper collector (420) is connected to the upper stator (200) and the bottom collector (4300 is connected to the bottom stator (300) whereby the magnetization is detected by the magnetic element, it should be apparent that the collectors (420, 430) are omitted and the magnetic element is directly connected to the bodies (210, 310).

Still furthermore, as explained the magnets (120, 130) are formed by connection of magnet pieces to form a ring shape, and the upper hole (220) and the bottom hole (320) opposite to the upper magnet (120) and the bottom magnet (130) face an N pole and an S pole or a border line thereof respectively. As a result, the number of upper hole (220) and the bottom hole (320) is preferably arranged in the same number of poles arranged on the magnets (120, 130).

Meanwhile, each radial width of the holes (220, 320) is preferably formed with a length capable of covering each radial thickness of the magnets (120, 130).

With continuing reference to FIG. 2, a width of the upper hole (220) at the upper stator (200) is formed longer than a thickness of the upper magnet (120), whereby an imaginary ring shape extending the inner peripheral side and the outer peripheral side of the upper hole (220) covers an entire area of the upper magnet (120) when viewed from an upper side.

FIG. 3 is a perspective view illustrating a torque sensor according to the present disclosure.

Unlike the conventional art, a direction of a magnetic flux at the magnet turns to an axial direction, and the upper stator (200) and the bottom stator (300) each vertically facing the magnet are such that the plurality of holes (220, 320) are formed at the bodies (210, 310) without any bent portions.

Based on the above configuration, the torque sensor according to the present disclosure twists a torsion bar in response to resistance from wheels if a steering wheel is manipulated to steer the wheels, whereby a rotary deviation is generated by an input shaft connected to the magnets (120, 130) and an output shaft connected to the stators (200, 300). That is, the magnets (120, 130) are rotated relative to the stators (200, 300) in response to the twist of the torsion bar. As noted above, magnetic charge is changed by rotation of the magnets (120, 130) based on the holes (220, 320) of the stators (200, 300).

Therefore, measurement of magnetic charge can be more accurately and easily performed because the torsion sensor according to the present disclosure presents a concept of forming a magnetic flux to the axial direction, and the stators measuring the magnetic change of the magnets include a plate-shaped body and a hole penetrating the body.

Furthermore, although the prior art needs to form and bend lug pieces of stator in the manufacturing and machining processes of the stator, the torsion sensor according to the present disclosure advantageously presents a stator formed only by a process of forming a hole on the ring-shaped body whereby control of dimensions and shapes can be easily enhanced, leading to improvement of productivity.

In short, the torque sensor according to the present disclosure can provide an operational reliability and structural simplicity as well.

Although the present disclosure has exemplified a torque sensor in a steering system, it should be apparent that the torque sensor according to the present disclosure can be utilized as a torque sensor for measuring rotational torque in the steering system and equipment including a relatively rotating member as well.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A torque sensor having a ring-shaped stator, the torque sensor comprising:
    a ring-shaped and axially-magnetized magnet connected to one of an input shaft and an output shaft, and producing a magnetic field in a direction parallel to an axis of the input shaft;
    a stator including a ring-shaped body axially discrete from the magnet and a plurality of holes, which face the magnet, vertically penetrating the body; and
    a collector coupled to the stator for concentrating magnetic change.

2. The torque sensor having a ring-shaped stator of claim 1, wherein the stator includes an upper stator arranged at an upper side of the magnet and a bottom stator arranged at a bottom side of the magnet, where the magnet is formed by connecting a plurality of magnet pieces, and the number of holes at the upper stator and the bottom stator is same as that of electrodes formed at the magnet.

3. The torque sensor having a ring-shaped stator of claim 2, wherein the magnet includes an upper magnet arranged at a bottom side of the upper stator and a bottom magnet arranged at an upper side of the bottom stator.

4. The torque sensor having a ring-shaped stator of claim 2, wherein the collector comprises an upper collector and a bottom collector coupled to the upper stator and the bottom stator, respectively, for concentrating magnetic change.

5. The torque sensor having a ring-shaped stator of claim 4, further comprising a magnetic element coupled to the upper and bottom collectors to detect the magnetic change of the stator.

6. The torque sensor having a ring-shaped stator of claim 1, further comprising a magnetic element coupled to the upper and bottom stators to detect the magnetic change of the stator.

7. The torque sensor having a ring-shaped stator of claim 1, wherein a radial length of the hole is longer than a radial width of the magnet.

8. The torque sensor having a ring-shaped stator of claim 2, wherein a radial length of the hole is longer than a radial width of the magnet.

9. The torque sensor having a ring-shaped stator of claim 3, wherein a radial length of the hole is longer than a radial width of the magnet.

10. The torque sensor having a ring-shaped stator of claim 4, wherein a radial length of the hole is longer than a radial width of the magnet.

11. The torque sensor having a ring-shaped stator of claim 5, wherein a radial length of the hole is longer than a radial width of the magnet.

12. The torque sensor having a ring-shaped stator of claim 6, wherein a radial length of the hole is longer than a radial width of the magnet.

13. A torque sensor having a ring-shaped stator, the torque sensor comprising:
   a ring-shaped and axially-magnetized magnet connected to one of an input shaft and an output shaft, and producing a magnetic field in a direction parallel to an axis of the input shaft;
   an upper stator and a bottom stator, each shaped of a ring plate, arranged at an upper and a bottom side of the magnet, and circumferentially arranged with a plurality of vertically penetrated holes which face the magnet; and
   an upper collector and a bottom collector coupled to the upper stator and the bottom stator, respectively, for concentrating magnetic change.

14. The torque sensor having a ring-shaped stator of claim 13, wherein the magnet includes an upper magnet arranged at a bottom side of the upper magnet and a bottom magnet arranged at an upper side of the bottom magnet.

15. The torque sensor having a ring-shaped stator of claim 13, wherein the magnet is circumferentially arranged with a plurality of magnet pieces.

16. The torque sensor having a ring-shaped stator of claim 15, wherein the number of holes is formed in the same number of electrodes on the magnet.

17. The torque sensor having a ring-shaped stator of claim 13, wherein a radial length of the hole is longer than a radial width of the magnet.

* * * * *